United States Patent
Ginzburg et al.

(10) Patent No.: US 7,817,593 B2
(45) Date of Patent: Oct. 19, 2010

(54) METHOD FOR AGGREGATION OF A NUMBER OF MEDIA ACCESS CONTROL (MAC) FRAMES INTO A SINGLE PHYICAL LAYER FRAME IN A DISTRIBUTED MAC LAYER

(75) Inventors: Boris Ginzburg, Haifa (IL); Solomon B. Trainin, Haifa (IL); Yuval Bachrach, Haifa (IL)

(73) Assignee: Intel Corporation, Santa Clara, CA (US)

( * ) Notice: Subject to any disclaimer, the term of this patent is extended or adjusted under 35 U.S.C. 154(b) by 1216 days.

(21) Appl. No.: 11/278,362

(22) Filed: Mar. 31, 2006

(65) Prior Publication Data

US 2007/0230454 A1 Oct. 4, 2007

(51) Int. Cl.
*H04W 4/00* (2009.01)
(52) U.S. Cl. ................ 370/328; 370/338; 370/392; 370/311; 370/349

(58) Field of Classification Search .......... 370/328, 370/338, 392, 311, 349, 468, 473, 345, 347, 370/206
See application file for complete search history.

(56) References Cited

U.S. PATENT DOCUMENTS

2005/0078598 A1* 4/2005 Batra et al. ............... 370/206
2006/0291436 A1* 12/2006 Trainin ..................... 370/338
2008/0049654 A1* 2/2008 Otal et al. ................. 370/311

OTHER PUBLICATIONS

Wilson, James M., "The Next Generation of Wireless LAN Emerges with 802.11n", *Technology@Intel Magazine*, (Aug. 2004), 1-8.

* cited by examiner

*Primary Examiner*—Joseph H Feild
*Assistant Examiner*—Huy D Nguyen
(74) *Attorney, Agent, or Firm*—Schwegman, Lundberg & Woessner, P.A.

(57) ABSTRACT

Embodiments of methods and apparatus for aggregating a plurality of media access control-layer frames into a single physical layer frame are generally described herein. Other embodiments may be described and claimed.

10 Claims, 6 Drawing Sheets

US 7,817,593 B2

METHOD FOR AGGREGATION OF A NUMBER OF MEDIA ACCESS CONTROL (MAC) FRAMES INTO A SINGLE PHYICAL LAYER FRAME IN A DISTRIBUTED MAC LAYER

RELATED PATENT APPLICATION

This patent application is related to commonly assigned, co-pending U.S. patent application Ser. No. 11/167,491, Trainin et al., entitled "Block Acknowledgement Request Apparatus, Systems, and Methods," filed Jun. 27, 2005.

BACKGROUND

Devices communicating in a wireless local area network (WLAN) communicate data in packet form. A packet typically includes a header and the data to be sent and received. The header identifies the packet and the header contents are defined by the communication protocol used in the LAN. If the WLAN supports the IEEE standard 802.11 family of protocols (e.g., IEEE 802.11a-1999 (published Sep. 16, 1999), IEEE 802.11b-1999 (published Sep. 16, 1999), IEEE 802.11e-2005 (published Sep. 22, 2005), IEEE 802.11g-2003 (published Jun. 12, 2003), and IEEE 802.11n (yet to be formally published)), a device that communicates using the WLAN consists of two layers of functionality; a physical layer that transfers and receives bits of data wirelessly, and a media access control (MAC) layer that interfaces with the physical layer and, among other things, formats data into frames for transmission and deals with access to the WLAN. Frames can be transmitted to send data from one device to another and to acknowledge that a frame of data was sent correctly.

Protocol overhead refers to the amount of additional information needed to send a packet over a LAN in addition to the actual desired data. This includes a packet preamble to identify a signal as a packet, a packet header, and an acknowledge packet to indicate that the transmission was successful or need to be resent. Protocol overhead often prevents a WLAN from reaching achievable throughput.

DETAILED DESCRIPTION

In the following detailed description, reference is made to the accompanying drawings which form a part hereof, and in which is shown by way of illustration specific embodiments in which the invention may be practiced. It is to be understood that other embodiments may be used and structural and logical changes may be made without departing from the scope of the present invention.

This document describes systems and methods to transmit data over a WLAN more efficiently. Two layers of functionality are implemented in a WLAN device that implements the IEEE 802.11™ series of standards: a medium access control (MAC) protocol and a physical (PHY) layer protocol called the Physical Layer Convergence Protocol (PLCP).

In the MAC protocol, a payload of data sometimes referred to as a MAC protocol Data Unit (MPDU) is encapsulated in a packet that includes header information at the start of the packet. When prompted by the MAC layer, the PLCP layer maps the MPDUs into transmit frames suitable for transmission. The PLCP layer adds a PLCP specific preamble and header to the MPDU. The IEEE 802.11™ standards refer to the composite transmission frame (i.e. the MPDU with the added PLCP preamble and PLCP header) as a Physical Layer Convergence Protocol (PLCP) protocol data unit (PPDU). The packet is then transmitted by the PLCP layer.

Figure 1:
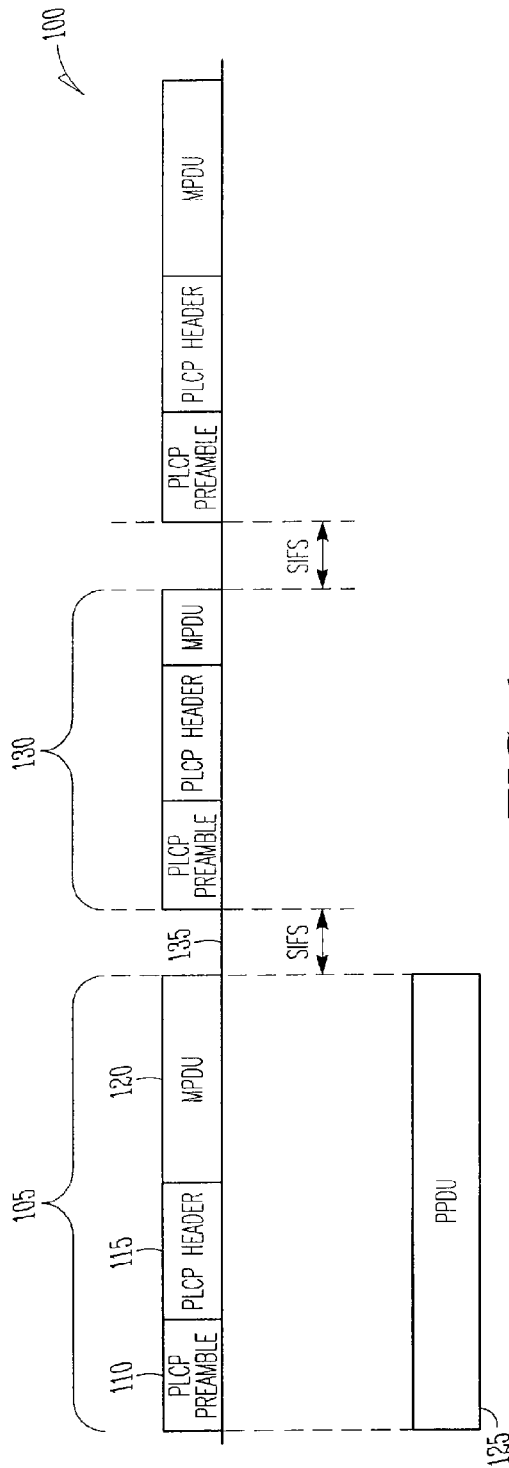
FIG. 1 illustrates an example of packets transmitted in a media access control (MAC) protocol.

FIG. 1 illustrates an example of packets 100 transmitted in a MAC protocol. In the example, a packet 105 includes a preamble 110, a header 115, and an MPDU 120. Each packet comprises a PPDU 125. The preamble 110 is transmitted to allow time for a receiving device to synchronize the phase of the receive data clock to the phase of the transmit data clock. The MPDU 120 varies in size up to 1500 bytes of data. The MPDU 120 is sometimes referred to as a PLCP Service Data Unit (PSDU) when describing the PLCP layer. The packet 105 can be transmitted to a single device, a group of devices, or all devices in a WLAN. The header 115 typically includes cyclic redundancy code (CRC) to provide error detection in the transmission.

When a receiving device detects a CRC error on the transmission of a packet, the receiving device discards the entire packet. If a packet is transmitted successfully, the receiving device transmits an acknowledge message (ACK) to indicate that the message was successfully transmitted. After a packet 105 is transmitted, devices must wait for a period of time called a short inter-frame space (SIFS) 135 to transmit an ACK message. If many MPDUs 120 are to be sent by a device, the device must send a single MPDU, wait for an ACK, send the second MPDU, wait for an ACK, and so on. The overhead to the protocol that includes the PLCP preambles, the PLCP headers, the ACK messages and the SIFS 135 reduces the amount of throughput of data on the WLAN.

Figure 2:
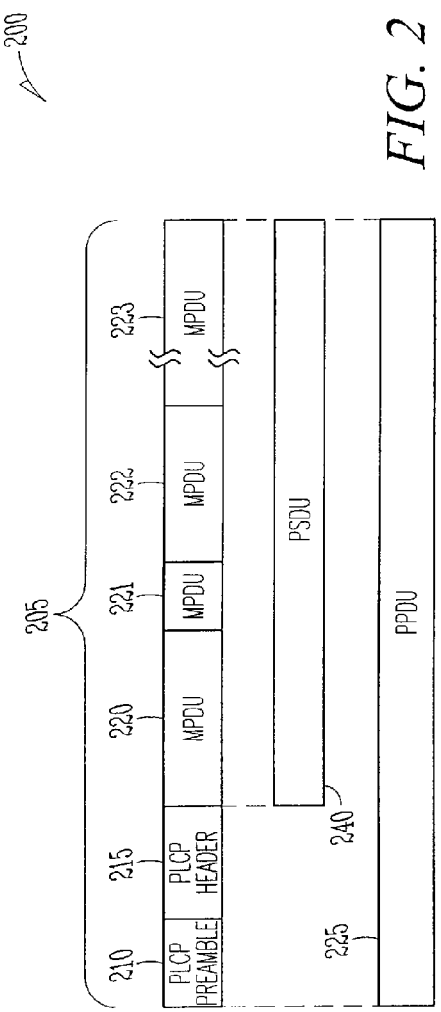
FIG. 2 illustrates a packet format that reduces transmission overhead.

FIG. 2 illustrates a packet format 200 that reduces overhead, thereby making data transmission more efficient. In the packet 205, a plurality of MPDUs 220, 221, 222, and 223 are sent in a single PPDU 225 and are aggregated into a single PSDU 240. The PSDU 240 can be viewed as a payload of aggregated MPDUs. In some examples the plurality of MPDUs are concatenated in order to form the PSDU 240. The packet 205 includes a single preamble 210 and a single header 215. Thus, if (N) MPDUs are transmitted in the packet 205, the overhead is reduced by (N−1) preambles, (N−1) headers, and (N−1) SIFS. If a single acknowledge (ACK) is transmitted for the single PPDU 225, i.e. a single block acknowledge, the overhead is further reduced by (N−1) ACK transmissions and the additional (N−1) SIFS.

In some embodiments, the single header 215 is a PLCP header and includes a byte count of the entire payload or PPDU 225, including the byte count of the plurality of MPDUs aggregated into the single PSDU 240. In some embodiments, the single header 215 includes a cyclic redundancy code (CRC). In some embodiments, the CRC is calculated over at least a portion of the PPDU 225. In some embodiments, the CRC is calculated only over a PLCP header. The header includes the byte count of the aggregated PPDU 225.

Figure 3:
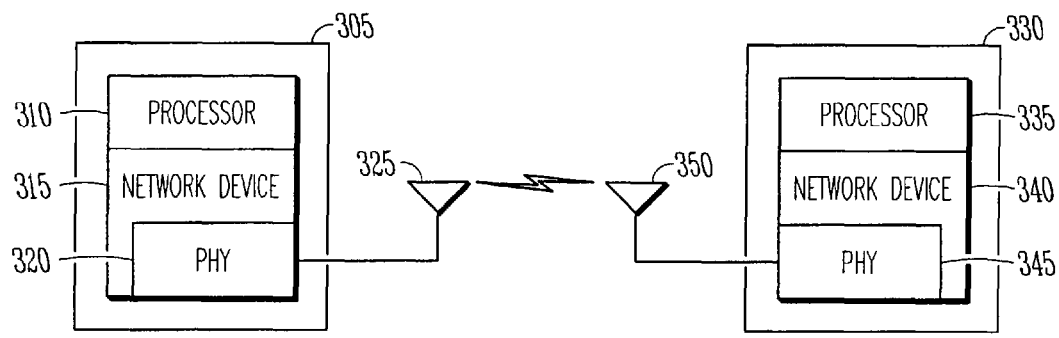
FIG. 3 is a block diagram of a system that includes a WLAN.

FIG. 3 is a block diagram of a system 300 that includes a WLAN. A WLAN may include multiple stations. FIG. 3 shows the simple case of two stations. A station includes a host device 305 that in turn includes a processor 310 and network device 315. The network device 315 includes a physical layer (PHY) transmitter 320 coupled to an antenna 325. A first host device 305 communicates wirelessly with a second host device 330. The second host device 330 includes a processor 335 and network device 340. In some embodiments, a receiving device is a client device. The network device 340 includes a physical layer (PHY) receiver 345 coupled to an antenna 350. Each of the host devices 305 and 330 includes a MAC layer that communicates with the PHY transmitter 320 and receiver 345.

The first host device 305 transmits a plurality of MPDUs aggregated into a single PPDU to the second host device 330. In some embodiments, the single PPDU that is transmitted includes a single header that includes CRC calculated over at least a portion of the single PPDU. The second host device 330 verifies at least a portion of the received single PPDU using the received CRC. The second host device transmits a single block acknowledge for the aggregated transmitted MPDUs upon verifying the PPDU.

The host devices 305 and 330 may be mobile, portable, or stationary. For example, a host device may be a laptop computer, a desktop computer, a handheld radio, or any other one-way or two-way device capable of communicating wirelessly with other devices, such as by radio frequency (RF) signals for example. In some examples, the network devices 315 and 340 may be a network adapter or a network interface card (NIC).

Figure 4:
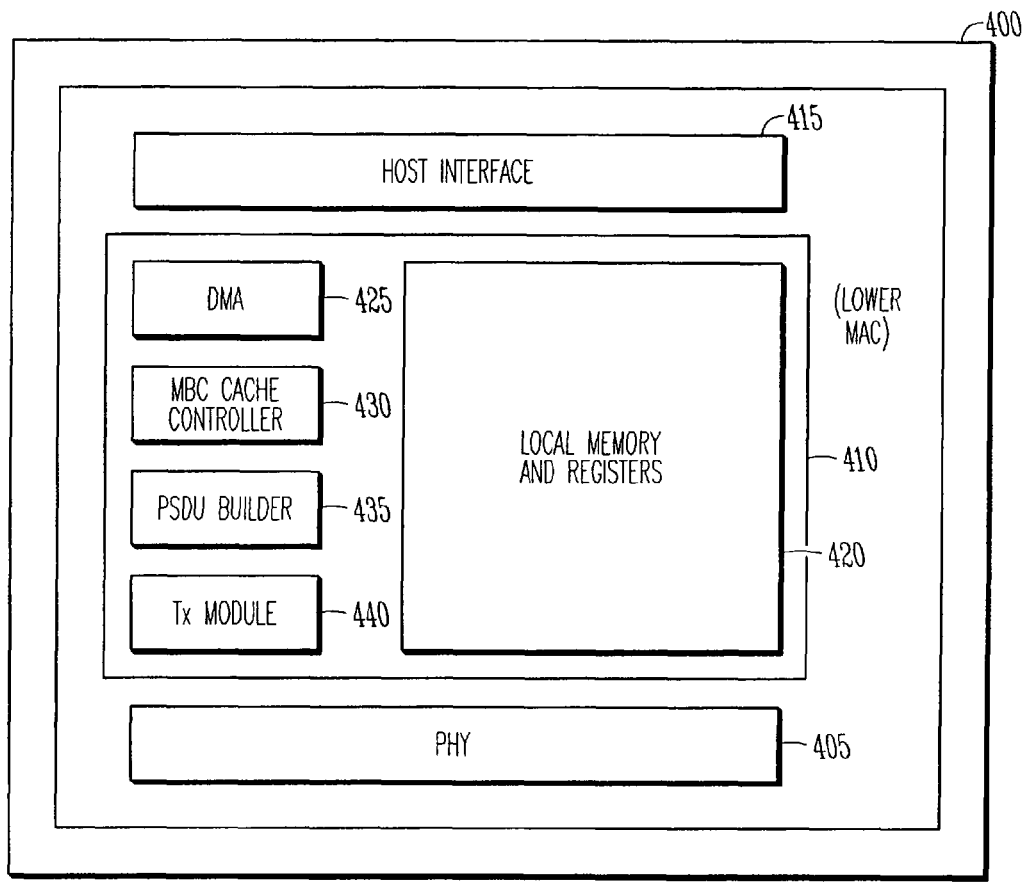
FIG. 4 is a block diagram illustrating portions of an apparatus commensurate with various examples in the present patent application.

FIG. 4 is a block diagram illustrating portions of an apparatus 400. In some examples, the apparatus 400 is included in a network adapter or a NIC. The apparatus 400 includes a PHY transmitter 405 to communicate frames of information over a wireless medium. The apparatus 400 also includes a lower medium access control layer (LMAC) 410 in communication with the PHY transmitter 405. The LMAC 410 aggregates a plurality of MPDUs into a single PPDU for transmission by the PHY transmitter 405. The LMAC 410 builds a PLCP header and a PSDU composed of a plurality of MPDUs to form the PPDU. In some examples, the LMAC 410 is implemented totally in hardware, such as a state machine for example. In some embodiments, the LMAC 410 is implemented in software, firmware, or any combination of software, firmware, and hardware running on a processor based subsystem. In some embodiments, the processor is a sequencer. A sequencer refers to a state machine or other circuit that sequentially progresses through a fixed series of steps to perform one or more functions. The steps are typically implemented in hardware or firmware.

The apparatus 400 communicates with a host device (e.g., the host device 305 of FIG. 3) using a host interface 415. The host device includes a host memory (e.g., the host memory of FIG. 5) to store MPDUs to be aggregated into a single PPDU and the LMAC 410 includes an LMAC local memory and registers 420. The host memory or the LMAC local memory and registers 420 can be a random access memory (RAM). In some examples, the memories include a dynamic random access memory (DRAM). In some examples, the memories include a static random access memory (SRAM). In some examples, the memories include flash memory. In some examples, the host memory or the LMAC local memory and registers 420 includes any combination of DRAM, SRAM, and flash memory.

In some examples, the LMAC 410 includes a direct memory access (DMA) unit 425 to transfer data between the host memory and the LMAC local memory and registers 420. In some examples, the LMAC local memory and registers 420 includes a MPDU block counter (MBC) cache and an MBC cache controller module 430. The MBC cache controller module 430 is in communication with the DMA unit 425 and requests a block of memory to be transferred between the host memory and the LMAC local memory and registers 420.

In some examples, the apparatus 400 includes a PSDU builder module 435 and a transmit module 440. The PSDU builder module 435 calculates the number of MPDUs to include in the single PPDU. In some examples, the PSDU calculates the number of MPDUs to include in a PPDU from a transmission opportunity interval (TxOP) and a transmission rate of the PHY transmitter 405. A TxOP is a time interval in which a device is allowed to transmit. It is typically defined by a start time and a maximum duration. The start time is defined from a beacon signal transmitted periodically. The TxOP is a defined interval of time following the beacon signal, called the target beacon transmission time (TBTT).

In some examples, the PSDU builder module 435 calculates the number of MPDUs from a straightforward calculation. If the TxOP is an interval of milliseconds (ms) and the transmission rate of the network is measured in bytes per millisecond (B/ms), then multiplying the TxOP by the rate gives the number of bytes that can be transmitted. The PSDU then transfers available MPDUs to satisfy the available byte count taking into account the preamble and header. The transmit module 440 enables aggregation of MPDUs into a single PPDU according to a number of MPDUs to be transmitted which is determined by the PSDU builder module 435. The transmit module 440 builds a single PLCP header to include in the PPDU and transfers the MPDUs from the host memory to the PHY transmitter.

In some examples, the transmit module 440 enables aggregation based on the byte count in the MBC cache controller. In some examples, if the byte count exceeds a predetermined byte count threshold value, the transmit module 440 enables the aggregation. If the byte count is less than the threshold, the transmit module 440 enables a regular non-aggregated transmission.

Figure 5:
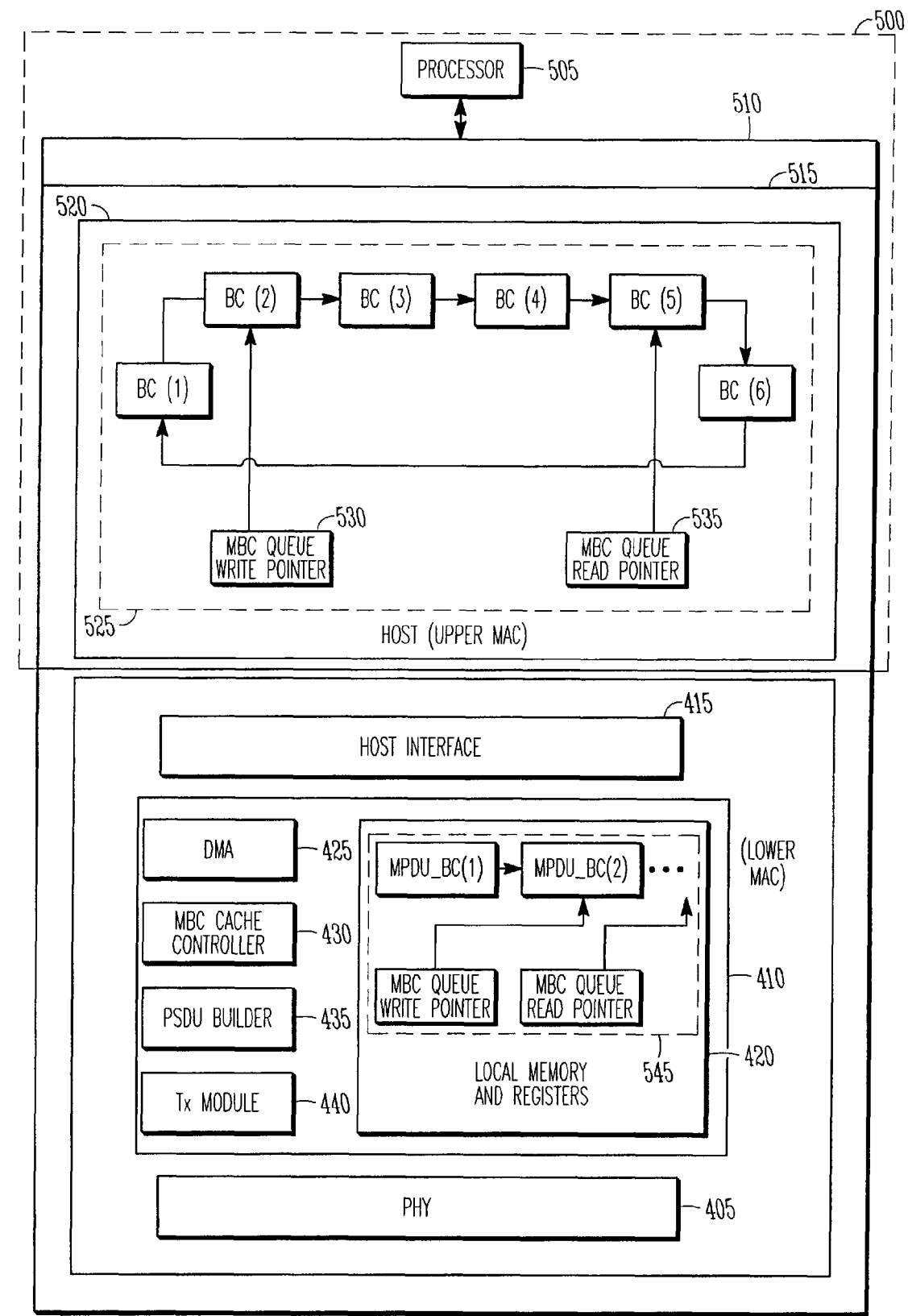
FIG. 5 is a block diagram illustrating portions of another apparatus commensurate with various examples in the present patent application.

FIG. 5 is a block diagram illustrating portions of the apparatus 400 in communication with portions of a host device 500 through the host interface 415. The host device 500 includes a processor 505 and a host memory 510. The host device 500 also includes a host driver 515 to execute on the processor 505. The host driver 515 includes a MAC layer, including an upper medium access layer (UMAC) 520 to store the MPDUs in the host memory. Thus, the MAC layer is distributed and includes two parts: the LMAC 410 and the UMAC 520. The UMAC 520 buffers MPDUs and formats the MPDUs into transmission frames. However, the UMAC 520 does not know when an aggregated transmission starts. The LMAC 410 governs the real-time part of the transmission protocol. The LMAC 410 defines the start and end of the aggregated packet based on the TxOP, the remaining time before the TBTT, the transmission rate, and other real-time constraints. However, the LMAC 410 typically only includes circuitry to possess one frame for transmission at a time. The LMAC 410 determines the beginning frame and the end frame, but the LMAC needs to also know how many frames the UMAC has buffered in the host memory 510.

The UMAC 520 stores MPDUs to be transmitted in the host memory 510 as a transmit queue. In some examples, the transmit queue includes a FIFO buffer and the MPDUs are transferred from the transmit FIFO to the PHY transmitter 405. The UMAC 520 also builds a transmit queue registry 525, or byte count buffer, to track the number of bytes in the stored MPDUs. In some examples, the transmit queue registry is organized as a ring buffer containing the length in bytes of the MPDUs in the transmit queue. In some examples, the byte count is stored as the byte count of the corresponding MPDU. In Table 1, each entry in the transmit queue registry 525 R(n) corresponds to the byte count (BC) in the MPDU, i.e. R(n)=BC.

TABLE 1

Byte Count Ring

| 1500 | 100 | 1500 | 1000 | 1500 | 0 | 0 | 0 | 0 |
|---|---|---|---|---|---|---|---|---|

In some examples, the byte count is stored as an accumulated sum of the MPDU byte counts. In Table 2, each entry in the transmit queue registry 525 R(n) corresponds to an accumulated sum of MPDUs, i.e. R(n)=R(n−1)+BC(n).

TABLE 2

Accumulated Byte Count Ring

| 1500 | 1600 | 3100 | 4100 | 5600 | 0 | 0 | 0 | 0 |
|---|---|---|---|---|---|---|---|---|

In some examples, the transmit queue registry 525 includes a write pointer 530 and a read pointer 535. To build the transmit queue registry 525, the UMAC 520 updates the write pointer 530 and the byte count when MPDUs are added to the transmit queue. The LMAC 410 updates the read pointer when MPDUs are removed from the transmit queue. In some examples, the UMAC 520 increments the write pointer 530 and the byte count when MPDUs are added to the transmit queue and the LMAC 410 increments the read pointer when MPDUs are removed from the transmit queue. In some examples, the UMAC signals that a transmission is pending to the LMAC when the UMAC stores the MPDUs, such as by adding them to the transmit queue for example.

To determine the number of MPDUs that are buffered by the UMAC 520 in order to construct the PPDU, the LMAC copies the transmit queue registry 525 to the MBC cache in the LMAC local memory and registers 420. In some examples, the LMAC only copies a portion of the transmit queue registry 545. In some examples, the MBC cache controller module 430 sends a request to the DMA unit 425 to transfer the transmit queue registry 525 to the MBC cache. The PSDU builder module 435 calculates the number of MPDUs to be transmitted in a single PPDU. In some examples, the byte count of the accumulated PSDU is determined from a straightforward calculation using the TxOP and the transmission rate as discussed above. If the transmit queue registry 525 stores an accumulated byte count, a binary search procedure can be used to quickly determine the byte count.

For example, assume the transmit queue registry 525 is organized as a ring buffer of N elements. The N elements contain an accumulated byte count sum and the LMAC is able to transmit L bytes in one PPDU, where N and L are positive integers. The purpose of the search is to find k elements of the transmit queue registry 525 such that R(k)≦L, but R(k+1)>L, assuming R(N)>L. An example of pseudo-code to implement the binary search is included below:

```
Function binarySearch ( input: array R[O...N]; int L; output:
    int k)
{
    if (L < R[0]) or ( L > = R[N] )
        return (−1); // not found;
    else {
    i=0; j=N;
    While ( i < j )
    do {
        k = roundup[ (i+j)/2 ];
        if (R[k] <=L)   i=k;
        else j=k;
    }
    return (k);
}
```

The MPDUs stored in the transmit queue corresponding to the k elements are transferred to the PHY transmitter 405 and are transmitted as one PSDU in the single PPDU.

Figure 6:
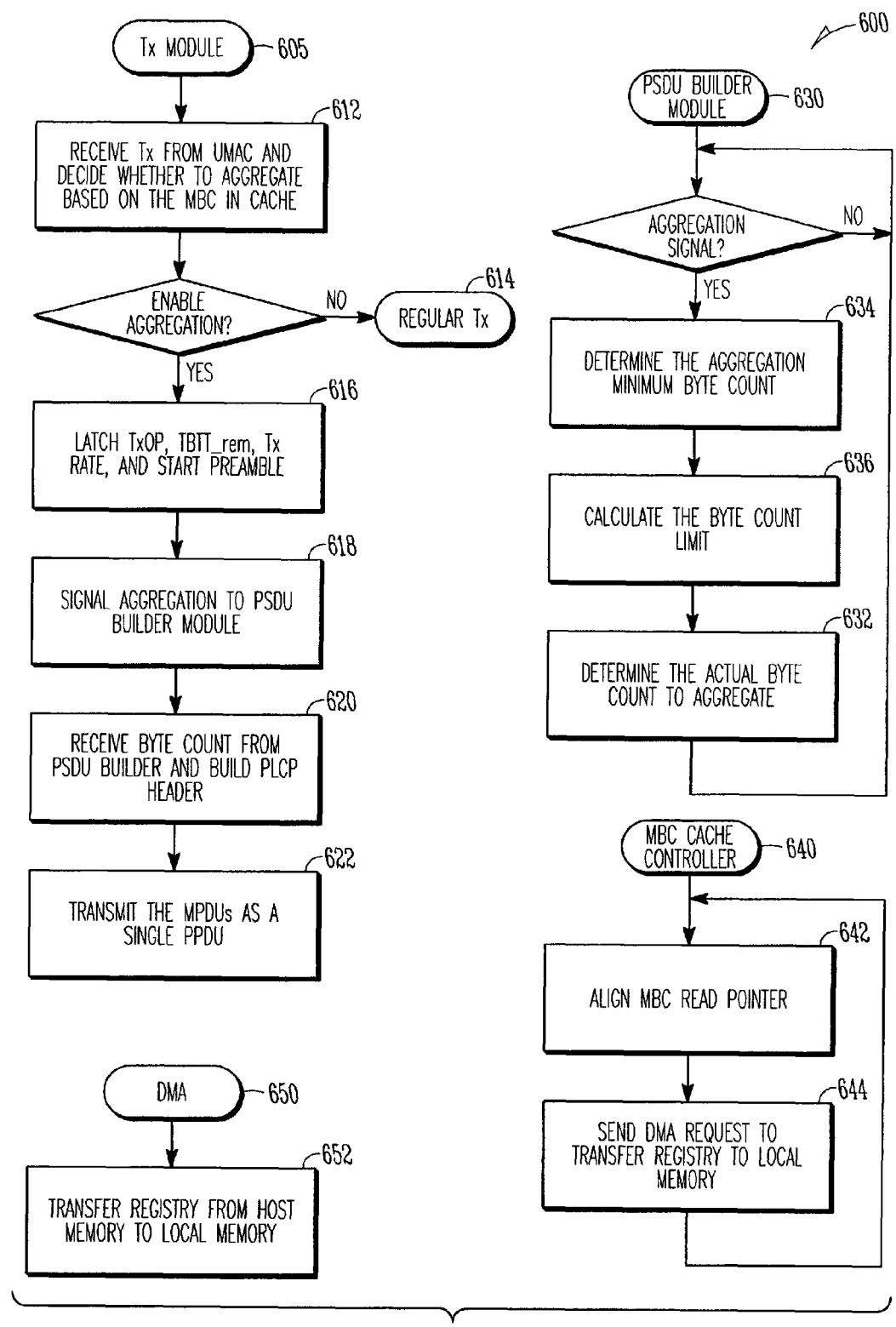
FIG. 6 is a block diagram of the functional flow of the elements of a lower medium access layer (LMAC).

FIG. 6 is a block diagram 600 of the functional flow of the elements of the LMAC. Although a particular order of elements is illustrated in FIG. 6, these elements may be performed in other temporal sequences. For example, all of the elements may work in parallel, or in serial, or in combinations of parallel and serial. The transmit module 605 receives a transmit signal from the UMAC at 612 and checks the MPDU byte count (MBC). Based on the byte count, the transmit module 605 determines whether to aggregate the MPDUs or to use a regular transmission at 614. At 616, if the MBC exceeds a threshold byte count, the transmit module 605 captures the transmit opportunity interval (TxOP), the transmit rate, the remaining time before the target beacon transmission time (TBTT), and begins transmitting a PLCP preamble. At 618, the transmit module 605 then signals the PDSU builder module 630 to calculate the number of bytes to aggregate at 632. The number is calculated by any of the methods described previously. In some embodiments, a minimum number of bytes for aggregation is determined by PSDU builder module 630 at 634, and a limit for the aggregated MPDU byte count is calculated at 636.

The MBC cache controller 640 then receives a signal to transfer all or a portion of the transmit registry to the LMAC local memory. This signal can originate from either the transmit module 605 or the PSDU builder module 630. At 642, the MBC cache controller 640 aligns the read pointer and at 644 sends a request to the DMA 650 to transfer the registry from the host memory to the LMAC local memory at 652. The PDSU builder module 630 calculates the number of MPDUs to transmit from the transferred transmit registry by accumulating byte counts between the read pointer and the write pointer, or until a byte count limit has been reached. The byte count of the number of bytes to be aggregated is then made available to the transmit module 605.

At 620, the transmit module 605 then builds a PLCP header using the byte count. In some examples, the PLCP header indicates that the packet contains aggregated MPDUs. After the PLCP header is transmitted by the PHY transmitter, the transmit module begins sending the individual MPDUs to the PHY transmitter for transmission. Thus, the actual aggregation can be done at the very last moment. The number of bytes to be sent is calculated and PLCP header is formed while the PLCP preamble is being transmitted by the WLAN. The MPDUs are transferred or pulled by the LMAC from the host memory frame by frame as previous frames are transmitted by the PHY transmitter. The result is better channel utilization and less overbooking of the channel than if the aggregation was done under the control of the UMAC.

Figure 7:
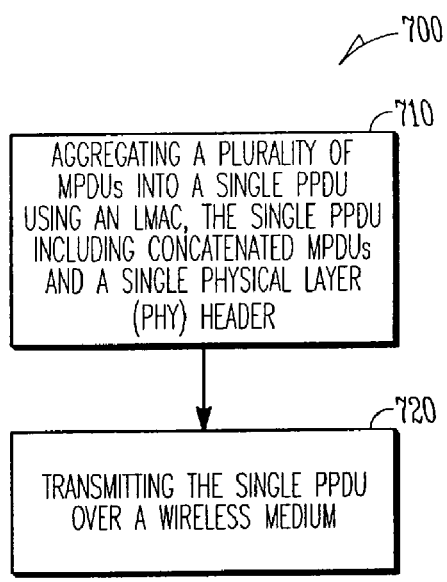
FIG. 7 is block diagram of an embodiment of a method of transmitting data over a WLAN.

FIG. 7 is a block diagram of a method 700 of transmitting data over a WLAN. At 710, a plurality of medium access control (MAC) protocol data units (MPDUs) are aggregated into a single Physical Layer Convergence Protocol (PLCP) protocol data unit (PPDU) using a lower media access layer (LMAC). The single PPDU includes concatenated MPDUs and a single physical layer (PHY) header. At 720, the aggregated MPDUs are transmitted as a single PPDU over a wireless medium.

Figure 8:
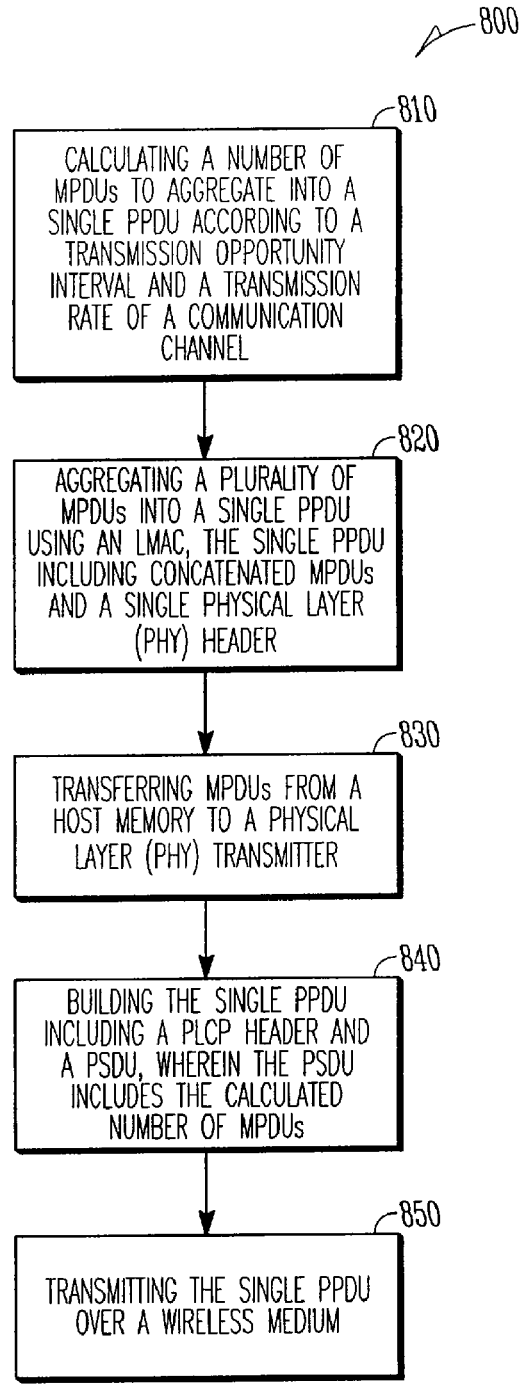
FIG. 8 is a block diagram of another embodiment of a method of transmitting data over a WLAN.

FIG. 8 is a block diagram of another embodiment of a method 800 of transmitting data over a WLAN. At 810, a number of MPDUs are calculated to aggregate into a PPDU. In some examples, calculating a number of MPDUs to aggregate includes calculating a number of MPDUs according to a transmission opportunity interval and a transmission rate of a communication channel by any of the methods described previously. At 820, MPDUs are aggregated into a single PPDU using an LMAC. At 830, MPDUs are transferred from a host memory to a physical layer (PHY) transmitter. At 840, an aggregated single PPDU is built that includes a PLCP header and a PLCP Service Data Unit (PSDU). The PSDU includes the calculated number of MPDUs. A PLCP preamble precedes the PLCP header. The PLCP preamble and header format is defined by the physical layer protocol. In some examples, transmitting the PPDU includes constructing the PLCP header while transmitting the PLCP preamble. At 850, the aggregated MPDUs are transmitted as a single PPDU.

Figure 9:
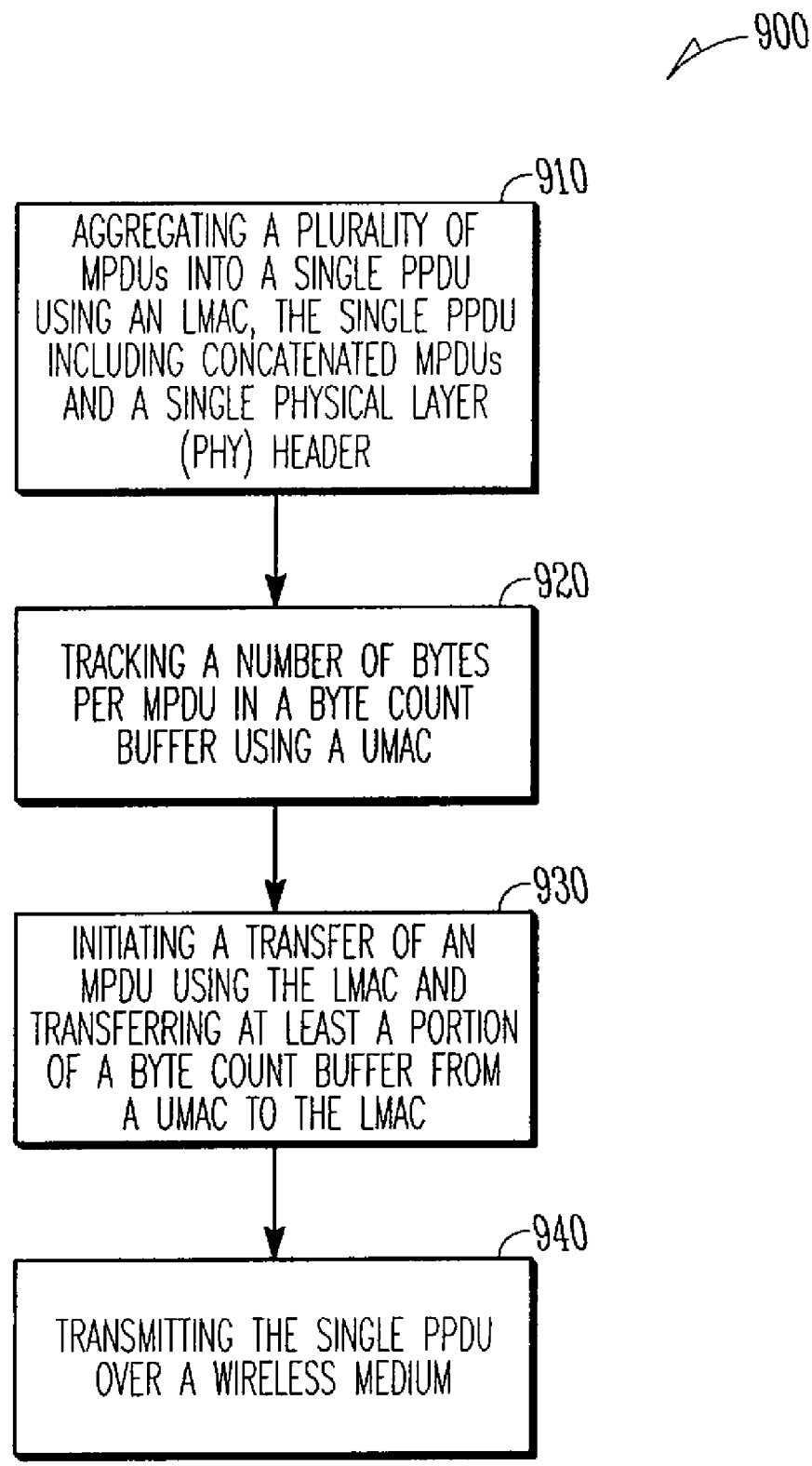
FIG. 9 is a block diagram of another embodiment of a method of transmitting data over a WLAN.

FIG. 9 is a block diagram of another embodiment of a method 900 of transmitting data over a WLAN. At 910, MPDUs are aggregated into a single PPDU using an LMAC. At 920, a number of bytes per MPDU is tracked in a byte count buffer using an upper media access control layer (UMAC). At 930, the transfer of an MPDU to the PHY transmitter is initiated using the LMAC. Also, the LMAC initiates a transfer of at least a portion of a byte count buffer from the UMAC to the LMAC. In some method examples, aggregating the MPDUs into a single PPDU is enabled by the LMAC according to a number of bytes indicated in the byte count buffer. For example, the LMAC may enable aggregating if the number of bytes exceeds a predetermined threshold number. At 940, the aggregated MPDUs are transmitted as a single PPDU.

In some examples, the method 900 includes storing MPDUs to be transmitted in a transmit queue. The transmit queue is included in the host memory. In some examples, the transmit queue includes a transmit FIFO buffer. The byte count buffer is a transmit queue registry corresponding to the transmit queue. The byte count buffer includes the number of bytes in an MPDU stored in the transmit queue. In some examples, a byte count buffer write pointer is updated with the UMAC when MPDUs are added to the transmit queue, and a byte count buffer read pointer is updated with the LMAC when MPDUs are transmitted.

Because the PLCP preambles and PLCP headers normally required for each MPDU is reduced to one PLCP preamble and PLCP header, the efficiency of the WLAN is increased. Also, the SIFS required between each MPDU transmission is eliminated. Further, transmitting each MPDU as a separate packet would require a receiving device to transmit an acknowledge message that the packet was received without errors. Incorporating acknowledge messages for the aggregated MPDUs into one acknowledge further improves the efficiency of the system. Therefore, some method examples include receiving a single block acknowledge message for the aggregated transmitted MPDUs.

In some examples, the PLCP header indicates that the packet contains aggregated MPDUs. In some examples, the fact that the transmission includes aggregated MPDUs is implicit by the nature of the transmission. In an example, the fact that the transmission includes aggregated MPDUs is implied when a message that includes a large amount of data is broadcast from a transmitting node in the WLAN to all other nodes in the WLAN. The receiving device parses the transmission to extract the MPDUs from the transmit data frames. In some examples, the parsing is done by a UMAC in the receiving device. As discussed previously, the PLCP header typically includes CRC. The transmitted CRC is calculated over the entire transmission including the aggregated MPDUs as a group. The receiving device verifies the transmission of the aggregated MPDUs using the CRC.

In some examples, the LMAC includes an indication in the PLCP header that a block acknowledge message is requested from the receiving device. In some examples, a single PPDU containing aggregated MPDUs always requires a block acknowledge and no special request is required. If a block acknowledge is received by the transmitting device the transmitting device resends the PPDU. The UMAC formats the MPDUs into transmission frames. In some examples, each transmission frame includes bits containing error detection information. In some examples, the error detection information includes CRC for an MPDU. In some examples, the error detection information includes parity information for an MPDU. By providing the error detection information, the receiving device can detect errors in the individual MPDUs as the transmission is parsed. The block acknowledge message can then include information identifying which MPDU(s) was sent in error. The transmitting device can then retransmit the bad MPDUs as a subsequent PPDU with aggregated MPDUs.

The methods described are capable of being implemented in software. The software may comprise computer executable instructions stored on computer readable media such as memory or other type of storage devices. Further, such methods correspond to modules, which are software, hardware, firmware or any combination thereof. Multiple functions are performed in one or more modules as desired, and the embodiments described are merely examples. The software is executed on a digital signal processor, ASIC, microprocessor, or other type of processor operating on a mobile, portable, or stationary computer system, such as a personal computer, server or other digital system.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually, collectively, or both by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own.

What is claimed is:

1. A method comprising:
aggregating a plurality of medium access control (MAC) protocol data units (MPDUs) into a single PLCP (physical layer convergence protocol) protocol data unit (PPDU) using a lower medium access layer (LMAC), wherein the single PPDU includes concatenated MPDUs and a single physical layer (PHY) header, including:
calculating a number of MPDUs to aggregate into the single PPDU according to a transmission opportunity interval and a transmission rate of a communication channel;
transferring MPDUs from a host memory to a PHY transmitter; and
building the single PPDU including a PLCP header and a PLCP service data unit (PSDU), wherein the PSDU includes the calculated number of MPDUs; and
transmitting the single PPDU over a wireless medium.

2. The method of claim 1, further including tracking a number of bytes per MPDU in a byte count buffer using an upper medium access layer (UMAC), and wherein transferring MPDUs includes initiating a transfer of an MPDU using the LMAC and transferring at least a portion of a byte count buffer from the UMAC to the LMAC.

3. The method of claim 2, further including enabling the aggregating of the plurality of MPDUs into the single PPDU according to a number of bytes indicated in the byte count buffer.

4. The method of claim 2, further including:
storing MPDUs to be transmitted in a transmit queue;
updating a byte count buffer write pointer with the UMAC when MPDUs are added to the transmit queue; and
updating a byte count buffer read pointer with the LMAC when MPDUs are transmitted.

5. The method of claim 1, wherein the single PHY header includes a PLCP header and a PLCP preamble, and wherein transmitting the PPDU includes constructing the PLCP header while transmitting the PLCP preamble.

6. The method of claim 1, further including receiving a single block acknowledge message indicating that the PPDU that includes the concatenated MPDUs was successfully transmitted.

7. A computer readable medium with instructions therein, which when processed results in a machine:
aggregating a plurality of medium access control (MAC) protocol data units (MPDUs) into a single PLCP (physical layer convergence protocol) protocol data unit (PPDU) using a lower medium access layer (LMAC), wherein the single PPDU includes concatenated MPDUs and a single physical layer (PHY) header, including:
calculating a number of MPDUs to aggregate into the single PPDU according to a transmission opportunity interval and a transmission rate of a communication channel;
transferring MPDUs from a host memory to a PHY transmitter; and
building the single PPDU including a PLCP header and a PLCP service data unit (PSDU), wherein the PSDU includes the calculated number of MPDUs; and
transmitting the single PPDU over a wireless medium.

8. The computer readable medium of claim 7, further including instructions, which when processed result in a machine aggregating a plurality of MPDUs by:
tracking a number of bytes per MPDU in a byte count buffer using an upper media access control layer (UMAC), and wherein transferring MPDUs includes initiating a transfer using the LMAC and transferring at least a portion of a transmit queue registry from the UMAC to the LMAC.

9. The computer readable medium of claim 8, further including instructions, which when processed result in a machine aggregating a plurality of MPDUs by enabling the aggregating of the plurality of MPDUs into the single PPDU according to a number of bytes indicated in the transmit queue registry.

10. The computer readable medium of claim 8, further including instructions, which when processed result in a machine aggregating a plurality of MPDUs by:
storing MPDUs to be transmitted in a transmit queue;
updating a byte count buffer write pointer with the UMAC when MPDUs are added to the transmit queue; and
updating a byte count buffer read pointer with the LMAC when MPDUs are transmitted.

* * * * *

UNITED STATES PATENT AND TRADEMARK OFFICE
CERTIFICATE OF CORRECTION

PATENT NO. : 7,817,593 B2  
APPLICATION NO. : 11/278362  
DATED : October 19, 2010  
INVENTOR(S) : Boris Ginzburg et al.

Page 1 of 1

It is certified that error appears in the above-identified patent and that said Letters Patent is hereby corrected as shown below:

On the face page, in field (54), in "Title", in column 1, line 3, delete "PHYICAL" and insert -- PHYSICAL --, therefor.

In column 1, line 3, delete "PHYICAL" and insert -- PHYSICAL --, therefor.

Signed and Sealed this  
Fourth Day of January, 2011

David J. Kappos  
*Director of the United States Patent and Trademark Office*